United States Patent [19]
Barron et al.

[11] Patent Number: 5,731,784
[45] Date of Patent: Mar. 24, 1998

[54] ADAPTIVE PULSE SHAPING IMPLEMENTATION AND METHOD FOR CONTROL OF SOLID STATE TRANSMITTER SPECTRUM AND TIME SIDELOBES

[75] Inventors: Robert R. Barron, Woodstock; David M. Schultheis, Columbia, both of Md.; Robert K. Long, Glenville, Pa.; Robert S. Allaman, Baltimore, Md.

[73] Assignee: Northrop Grumman Corporation, Los Angeles, Calif.

[21] Appl. No.: 683,276

[22] Filed: Jul. 18, 1996

[51] Int. Cl.⁶ .................................................. G01S 7/282
[52] U.S. Cl. .................. 342/204; 342/33; 342/36
[58] Field of Search ............................... 342/204, 21, 29, 342/32, 33, 35, 36, 37, 175

[56] References Cited

U.S. PATENT DOCUMENTS

| | | | |
|---|---|---|---|
| 5,103,233 | 4/1992 | Gallagher et al. | 342/408 |
| 5,115,243 | 5/1992 | Perry et al. | 342/158 |
| 5,115,244 | 5/1992 | Freedman et al. | 342/158 |
| 5,128,683 | 7/1992 | Freedman et al. | 342/158 |
| 5,173,706 | 12/1992 | Urkowitz et al. | 342/99 |
| 5,220,331 | 6/1993 | Gunter | 342/70 |

OTHER PUBLICATIONS

Paper entitled "The ARSR-4 High Fidelity Solid State Transmitter" by Messrs. Barron and Schultheis, Westinghouse Electric Corporation; May 1995.

*Primary Examiner*—John B. Sotomayor
*Attorney, Agent, or Firm*—Walter G. Sutcliff

[57] ABSTRACT

A radar detection system includes a transmitter and a receiver. The transmitter generates a pulse including a first subpulse generated at a first predetermined frequency and a second subpulse generated at a second predetermined frequency. At least one of the first and second subpulses include a digitally adjusted rise time and fall time, each of the rise time and fall time being separately adjustable independent of the other to provide for the relative lowering of transmission power above and below the first and second predetermined frequencies. The transmitter then transmits generated first and second subpulses at the respective first and second predetermined frequencies, as digitally adjusted in rise and fall time. The radar detection system further includes a receiver for detecting the first transmitted subpulse at the first predetermined frequency for relatively long range radar detection and for detecting the second transmitted subpulse at the second predetermined frequency for relatively short range radar detection.

35 Claims, 9 Drawing Sheets

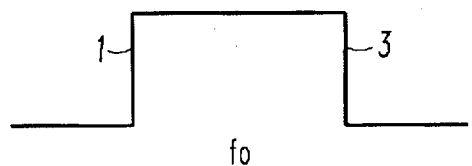
FIG.1a
*PRIOR ART*
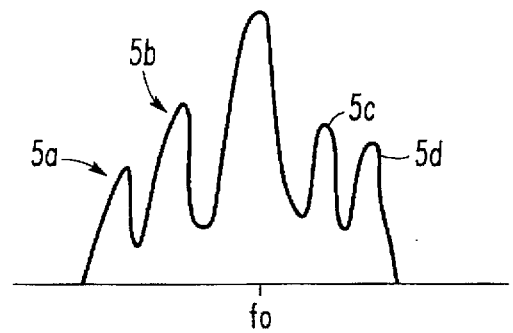
FIG.1b
*PRIOR ART*
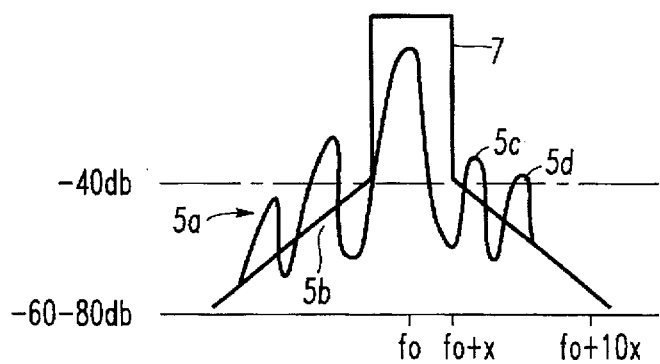
FIG.1c
*PRIOR ART*
FIG.1d
*PRIOR ART*
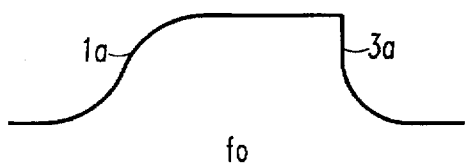

FIG.6
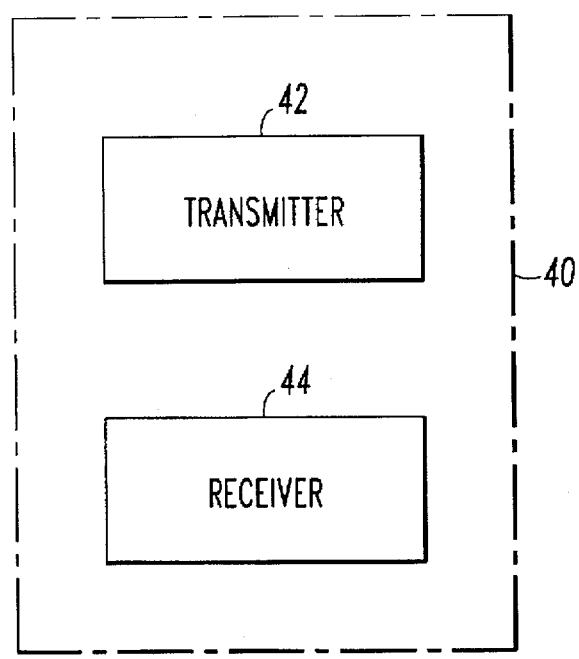
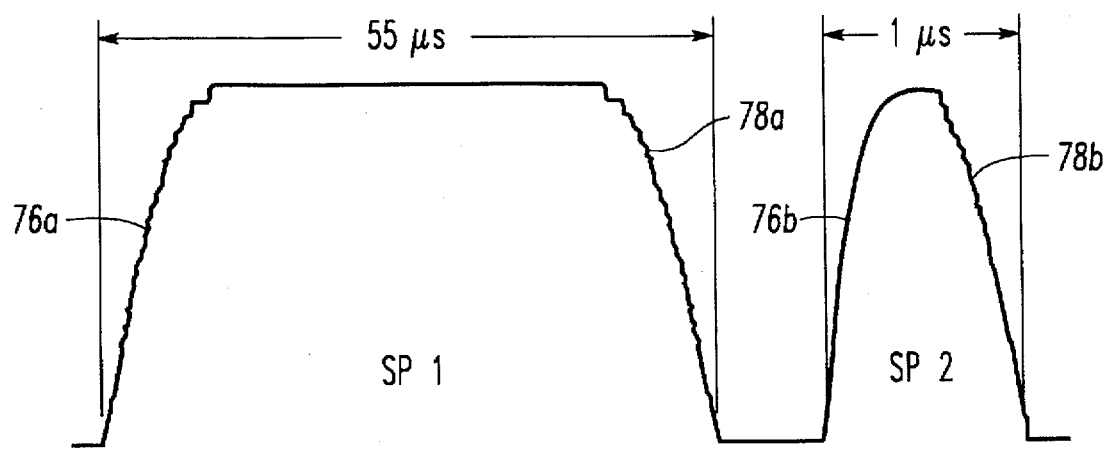
FIG.9

ADAPTIVE PULSE SHAPING IMPLEMENTATION AND METHOD FOR CONTROL OF SOLID STATE TRANSMITTER SPECTRUM AND TIME SIDELOBES

BACKGROUND OF THE INVENTION

1. Technical Field of the Invention

The present application is directed to a pulse generation and shaping method, a transmitter utilizing the method, and radar detection system including a receiver and a transmitter utilizing the pulse generation shaping method. More specifically, the present application is directed to pulse shaping by adjusting rise times and fall times of generated pulses to maintain significant power output at a predetermined pulse frequency and to lower sidelobes around (above and below) the predetermined pulse frequency during transmission.

2. Description of Related Art

Solid state transmitters have become an important part of modern radar systems. The inclusion of a solid state transmitter in a radar system generally has mandated the use of multiple pulse frequencies and encoded waveforms to meet radar detection requirements. The multifrequency operation and waveform coding have placed constraints on designs of the solid state transmitters. First, the continually increasing demand for radio frequency spectrum use (particularly in the United States and Europe), has mandated that occupied spectral width of the transmitted waveform must be kept to a minimum so as to not interfere with other equipment. Second, the encoded pulse waveform must provide a means to view closely spaced targets at a wide variety of doppler speeds and radar cross sections with excellent range resolution.

The range resolution of radar is directly related to the width of the recompressed encoded pulse waveform. Thus, a pulse including a pulse width of a short time period can be used for short range information and a pulse width of a long time period can be used for long range radar detection. The ability to detect closely spaced targets of greatly varying cross sections is related to the time sidelobes of the recompressed pulse. If the sidelobes are too high, the target return from the object detected can get lost in the sidelobe.

Transistors have been traditionally used in solid state transmitters. However, transistors include input/output characteristics that are nonlinear. Previously known transmitters utilized these transistors in parallel to increase power of the radar transmitter. However, for drive levels below a certain threshold, the transistor provides no output power at all. When this threshold was reached, the device typically snapped off in less than 30 nanoseconds. This caused a sharp or fast fall time of the pulse, and severely impacted the occupied spectral bandwidth and time sidelobe performance of the radar transmitter.

More specifically, since the transistors utilized were non-linear, their leading and trailing edges (of the pulse) tended to be sharp in the time domain, i.e. they tended to drop from a predetermined peak value of the pulse to a minimum value in a very short period of time, as shown in prior art FIG. 1a for example. The steep rise time 1, of the pulse generated at a frequency $f_o$ for example, and the sharp fall time 3 of the pulse, are illustrated in FIG. 1a.

Such a pulse generated with such steep rise time and sharp fall time, when translated to the frequency domain as shown in prior art FIG. 1b for example, produced a large peak pulse at the frequency $f_o$ and several sidelobes 5a–5d (as shown in FIG. 1b), at frequencies both below and above the main transmission frequency of $f_o$. These sidelobes 5a–5d, generated by the steep rise time 1 and sharp fall time increased the spectral width of the transmitted waveform. Such a transmitted pulse did not comply with transmission regulations requiring that the spectral width of a transmitted waveform be kept to a minimum.

In an effort to solve the aforementioned sidelobe problem, prior art solid state transmitter design attempted to utilize high powered, narrow bandpass filters to reduce the occupied spectral bandwidth of the radar transmission. As shown in prior art FIG. 1c, by utilizing such filters 7 in FIG. 1c for example, the filter tended to cut off the excess sidelobes to meet appropriate regulations.

For example, the FCC allowed transmission of power within a predetermined range of $f_o$ up to a negative 40 dB drop point. Then, beyond a frequency $f_o+x$ representing the 40 dB drop point, the FCC required a roll off of power 20–40 dBs per decade, out to a frequency $f_o+10x$. These standards were set by the National Telecommunications Institute of America (NTIA) for spectral width in the United States.

The approach using such filters had several disadvantages, however. The approach required that each radar site had to be equipped with a unique filter set to operate at a fixed frequency. Multiple frequencies were possible with multiple filters and diplexers, but this added to the loss incurred. At S-band, the loss for a two-frequency bandpass filter was estimated to be in excess of 1 dB. This meant that the transmitter was required to provide twenty percent more output power for the same radar performance. Since the cost of solid state transmitters scaled almost linearly with output power, this meant that the transmitter cost twenty percent more.

In an attempt to solve the aforementioned problems, the ARSR-4 solid state transmitter was developed. The details of this transmitter are discussed in the May 22–28, 1994 publication entitled "The ARSR4 High Fidelity Solid State Transmitter" by Robert R. Barron and David M. Schultheis, the contents of which are hereby incorporated by reference. In such a transmitter, it was discovered that by sequentially turning on and off a plurality of amplifiers cascaded together, the rise time 1a of a pulse as shown in prior art FIG. 1d, could be sloped or rounded as compared to the steep rise time 1 as shown in FIG. 1a. The sloping of the rise time 1a was achieved by sequentially delaying the production of a predetermined output pulse in a plurality of cascaded amplifiers. However, with such a transmitter, any sloping of the rise time 1a produced an inverse slope (exponential decrease) in the fall time 3a (or vice versa). This inverse rise time 1a and fall time 3a is illustrated in FIG. 1d. A solid state transmitter block diagram of the ARSR-4 is shown in prior art FIG. 2.

The ARSR-4 transmitter provided two main channels with independent phase control for switching between high and low antenna beam patterns as shown in FIG. 2. The ARSR-4 was designed for use in detecting and tracking aircraft in route, and produced a first subpulse of ninety (90) microseconds at a first predetermined frequency F1, and a second subpulse of sixty (60) microseconds at a second predetermined frequency F2 as shown in prior art FIG. 5b. Using the long range 90 microsecond subpulse, the maximum radar detection range was 250 nautical miles, and using the 60 microsecond subpulse, the minimum radar detection range was five nautical miles.

As shown in prior art FIG. 2, the transmitter included a phase control device 4, connected to a preamplifier 6, which was then connected to a preamplifier switch 8. In addition to the high and low channels, a Look Down channel was included, including one RF panel, which was used to provide additional power in the low beam.

The preamplifier switch 8 was then connected to the driver circuit 10, which was individually connected to each of the channel drivers 12a and 12b, and the Look Down channel driver 12c. Each of the channel drivers 12a and 12b were then connected to input splitters 14a and 14b, respectively, with input splitter 14a being connected to each of three RF panels 2a–2c. The input splitter 14b was connected to each of three RF panels 2d–2f. The aforementioned RF panels 2a–2c were then connected to output combiner 14c, and the RF panels 2d–2f were then connected to the output combiner 14d. Similarly, the Look Down channel included the combiner 14e connected to Look Down channel driver 12c.

Finally, as shown in prior art FIG. 2, the output combiner 14c was then connected to coupler 16a, to a waveguide 18a, and to the beam forming matrix 20 to form the high beam; with the output combiner 14d being connected to coupler 16b, waveguide 18b, and the aforementioned beam forming matrix 20 to produce the low beam. Somewhat similarly, the Look Down channel included output combiner 14e connected to coupler 16c, and then to waveguide 18c.

Finally, a transmitter controller 22 was utilized to control the sequential delay and activation with the RF panels to shape the high beam and low beam pulses in the manner previously described. Namely, a pulse shape sequencer or pulse shaper of the transmitter controller 22, controlled the turning on and off of amplifiers within the RF panels, to force the shape of the output pulse to produce a more gradual rise time 1b, 1c as shown in prior art FIG. 5b and to produce a varied fall time 3b, 3c.

Prior art FIG. 3 illustrates an RF panel 2 of the ARSR-4 transmitter, which typically included 12 power amplifier modules per side (each RF panel 2 being dual sided). Each channel included three double sided RF panels 2. The RF input power, for example 700 watts, was fed to a 1:3 splitter switch assembly 24. Three equal power outputs of the 1:3 splitter switch assembly 24 were then fed to three 1:4 splitters 26a–26c, which in turn fed the 12 power amplifier (PA) modules 28a–28l. The PA modules contained five RF power transistors in a one-driving-four configuration. PA modules 28a–d were connected to 16:1 combiner 30a; PA modules 28e–h were connected to 16:1 combiner 30b; and PA modules 28i–l were connected to the 16:1 combiner 30c. The output of the three combiners 30a–30c were then output to a 3:1 stripline combiner 32, the stripline combiner 32 containing isolators (ISOL) to protect the transistors from adverse problems of the panel output. The combined output power of each half RF panel (the RF panel being double sided) was typically 8 kW.

In the ARSR-4 solid state transmitter, PIN diodes were utilized in the aforementioned 1:3 splitter switch 24 for example, to reduce the occupied spectral bandwidth by sequentially turning on and off the PA modules 28a–28l within the transmitter. As shown in prior art FIG. 4, the transmitter controller 22 included a non-volatile memory 34 wherein pulse rise time patterns were stored. The transmitter controller 22 included a pulse shape sequence which was fully programmable for edge shape (based on a predetermined algorithm) and for rise or fall time (up to 2 μsec). The ARSR-4 transmitter used a cosine squared pattern as the algorithm, preferably with a 10% to 90% fall time of 500 nsec. FIG. 4 illustrates the pulse shaping technique implemented in the ARSR-4. Namely, prior art FIG. 4 illustrates a pulse shape sequencer block diagram of the transmitter controller 22.

Essentially, the pulse rise time pattern was stored in non-volatile memory 34 after being determined from the cosine squared pattern and rise time length. The pulse rise time pattern was then output from non-volatile memory 34 to eighteen program controllers 36a–36e (only five of the eighteen program controllers are shown in FIG. 4), and was then down-loaded to delay lines 38a–38e (only five of eighteen delay lines being shown in FIG. 4) at system turn-on. The eighteen digitally controlled analog delay lines (represented by 38a–38e) were then used to sequentially enable 18 groups of RF PA modules.

In other words, in the ARSR-4 solid state transmitter, eighteen time-delayed pulse steps, as shown in FIG. 5a, were used to shape the rise time 1b, 1c of the output pulse as shown in prior art FIG. 5b. Thus, the RF output from the combiner produced the first ninety microsecond subpulse and a second sixty microsecond subpulse as shown in FIG. 5b. By utilizing the time delayed pulse steps, the rise times 1b and 1c of the subpulses were rounded and thus the time sidelobes corresponding to the rise time were reduced in the time domain.

However, in the ARSR-4, the rise times and fall times were joined together by a pulse of common width as shown in FIG. 5a. In other words, if the rise time pulse were shifted to the right, then the fall time pulse would be shifted to the right. Therefore, as shown in FIG. 5b, the fall time 3b, 3c of the subpulses were inverse to the respective rise times 1b, 1c.

Therefore, although sidelobes corresponding to the rise time were adequately compensated for and reduced, sidelobes corresponding to the fall time were not independently reduced and were thus increased when the rise times were decreased. Problems and other drawbacks occurring with the ARSR-4 solid state transmitter were as follows.

First, as previously stated, the rise and fall times of the output RF waveform were not independently programmable. The shape of the fall pattern 3b, 3c was the inverse of the rise pattern 1b, 1c as illustrated in FIG. 5b. Furthermore, when two or more subpulses were used, the same shaping was applied to each subpulse since not only were the rise and fall times linked together, but the same subpulse pattern was used to shape the rise and fall times of each subpulse, i.e. a train of both subpulses was shifted together to generate the sloped rise time as shown in FIG. 5a.

Additionally, the inherent delay of analog delay lines varied from unit to unit and there was a significant delay variation versus temperature for long delay times (greater than or equal to one microsecond). These anomalies resulted in inconsistent transmitter spectrum performance from system to system.

Still further, the technique was not flexible for different transmitter architectures and the number of discrete steps (eighteen being used in the ARSR-4) was not easily expandable.

Finally, the switching speed for the PIN diode, by switching circuitry, varied significantly from unit to unit. The negative bias voltage was regulated utilizing a zener diode circuit. This caused poor voltage regulation on a pulse to pulse basis and varied from unit to unit due to bypass capacitor tolerance. Due to the high negative bias voltage, high voltage transistors were used with less than optimal switching speeds.

SUMMARY OF THE INVENTION

An object of the present invention is to produce a pulse shaping method for a transmitter which overcomes the various drawbacks of the prior art ARSR-4 transmitter.

Another object of the present invention is to provide a pulse shaping technique which enables separate and independent digital adjusting of both a rise time and a fall time, and which enables separate and independent adjustment of rise and fall times of different subpulses.

An additional object of the present invention is to provide a pulse shaping technique for shaping rise and fall times of pulses and subpulses of extremely small pulse widths to provide for accurate short range detection usable in airports, for example.

A still further object of the present application is to provide a pulse shaping technique which sufficiently increases the number of discrete steps used for shaping rise and fall times of pulses by utilizing a small time constant to shape short pulses.

An even further object of the present application is to decrease response times of diodes used in the transmitter by lowering the negative bias of the diodes.

The aforementioned and additional objects of the present invention are fulfilled by providing a pulse shaping method for use in a transmitter, comprising the steps of:

(a) generating a pulse at a predetermined frequency;

(b) digitally adjusting at least one of a rise time and a fall time of the pulse, each of the rise time and fall time of the pulse being separately adjustable independent of the other to provide for transmission of a relatively narrow spectral width at the predetermined frequency; and (c) outputting the generated pulse as digitally adjusted, for subsequent transmission by the transmitter at the predetermined frequency.

The aforementioned and other objects of the present invention are further fulfilled by providing a transmitter, comprising:

pulse generating means for generating a first subpulse at a first predetermined frequency and a second subpulse at a second predetermined frequency, different from the first predetermined frequency;

pulse shaping means for digitally adjusting at least one of a rise time and a fall time of at least one of the generated first subpulse and second subpulse, each of the rise time and fall time of at least one of the first and second subpulses being separately adjustable independent of the other to provide for transmission of a relatively narrow spectral width at the first and second predetermined frequencies; and transmission means for transmitting the generated first subpulse and second subpulse at the respective first and second predetermined frequencies, as digitally adjusted by the pulse shaping means.

The aforementioned and other objects of the present invention are even further fulfilled by providing a transmitter, comprising:

timing control means for storing a first adjustable pulse length for a first subpulse and a second adjustable pulse length from a second subpulse and for storing a first incremental adjustment pattern for adjusting a rise time of the first subpulse, a second incremental adjustment pattern for adjusting a fall time of the first subpulse, a third incremental adjustment pattern for adjusting a rise time of the second subpulse, and a fourth incremental adjustment pattern for adjusting a fall time of the second subpulse, the rise time and fall time of each of the first and second subpulses being separately and independently adjustable; and output means for outputting a transmission pulse including the first subpulse, output at a first frequency, of the first adjustable pulse length with rise and fall times separately adjusted by the respective first and second incremental adjustment patterns, and the second subpulse, output at a second frequency different from the first frequency, of the second adjustable pulse length with rise and fall times separately adjusted by the respective third and fourth incremental adjustment patterns, the rise and fall times of each of the first and second subpulses being independently adjusted to provide for transmission of a relatively narrow spectral width at each of the first and second frequencies.

The aforementioned and other objects of the present invention are still further fulfilled by providing a radar detection system comprising:

a transmitter including, pulse generating means for generating a first subpulse at a first predetermined frequency and a second subpulse at a second predetermined frequency, different from the first predetermined frequency, pulse shaping means for digitally adjusting at least one of a rise time and a fall time of at least one of the generated first subpulse and second subpulse, each of the rise time and fall time of at least one of the first and second subpulses being separately adjustable independent of the other to provide for transmission of a relatively narrow spectral width at the first and second predetermined frequencies, and transmission means for transmitting the generated first and second subpulses at the respective first and second predetermined frequencies, as digitally adjusted by the pulse shaping means; and a receiver for detecting the first transmitted subpulse at the first predetermined frequency for relatively long range radar detection and for detecting the second transmitted subpulse at the second predetermined frequency for relatively short range radar detection.

These and other objects of the present application will become more readily apparent from the detailed description given hereinafter. However, it should be understood that the preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 1a–1d illustrate prior art depictions of a generated pulse with a sharp rise time and fall time in the time domain (FIG. 1a) and in the frequency domain (FIG. 1b); illustrate the use of a prior art filter for reducing sidelobes (FIG. 1c); and illustrate a prior art generated pulse with an increased rise time and a fall time inverse to the rise time (FIG. 1d);

Prior art

Prior art

Prior art

Prior art FIG. 5b illustrates two subpulses generated by the prior art technique of FIG. 5a;

FIG. 6 depicts a block diagram of the transmitter and receiver of the present application;

FIG. 9 illustrates subpulses generated by the pulse shaping technique of the present invention.

Figure 2A:
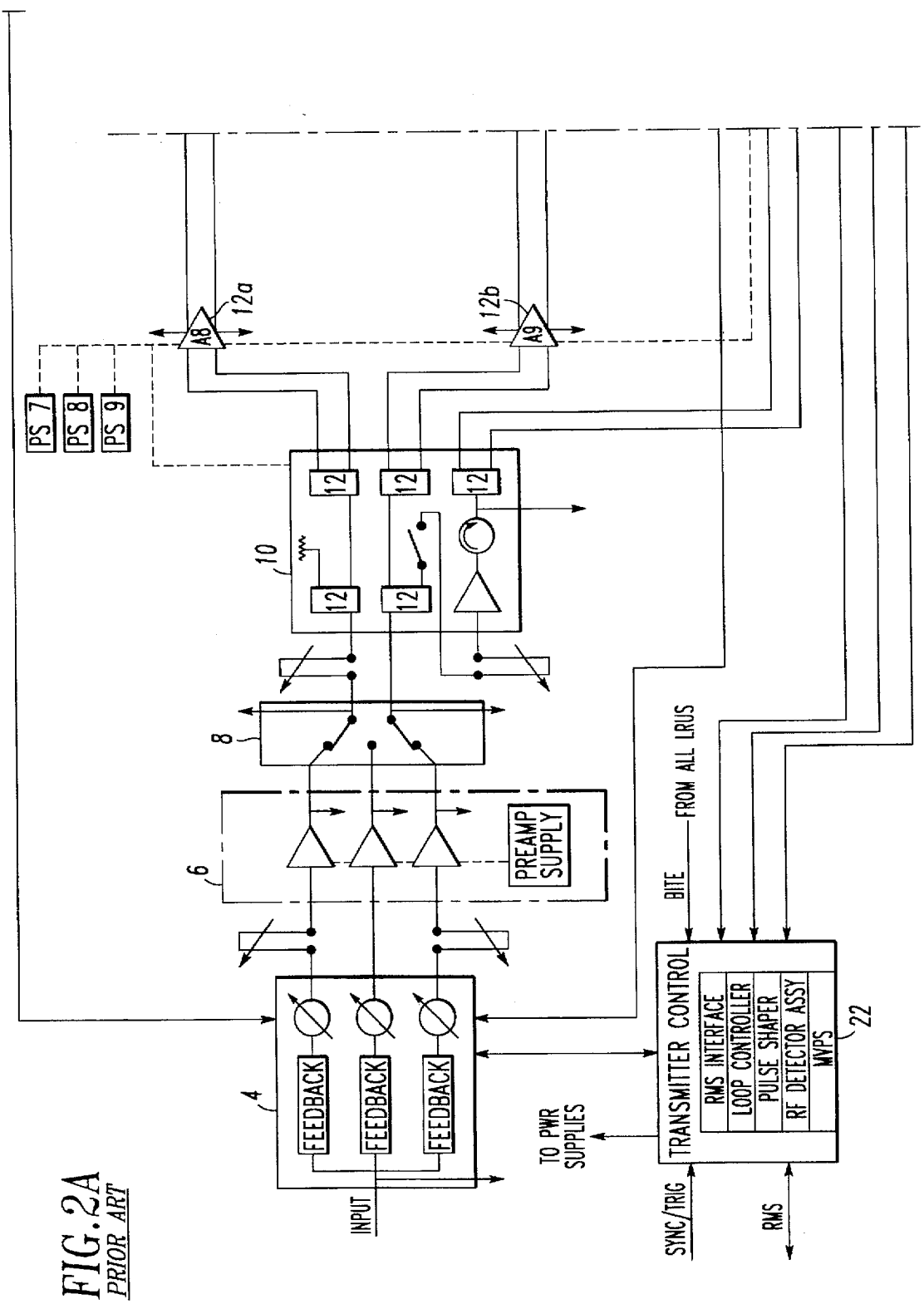
FIG. 2 illustrates a block diagram of the ARSR-4 solid state transmitter.
Figure 2B:
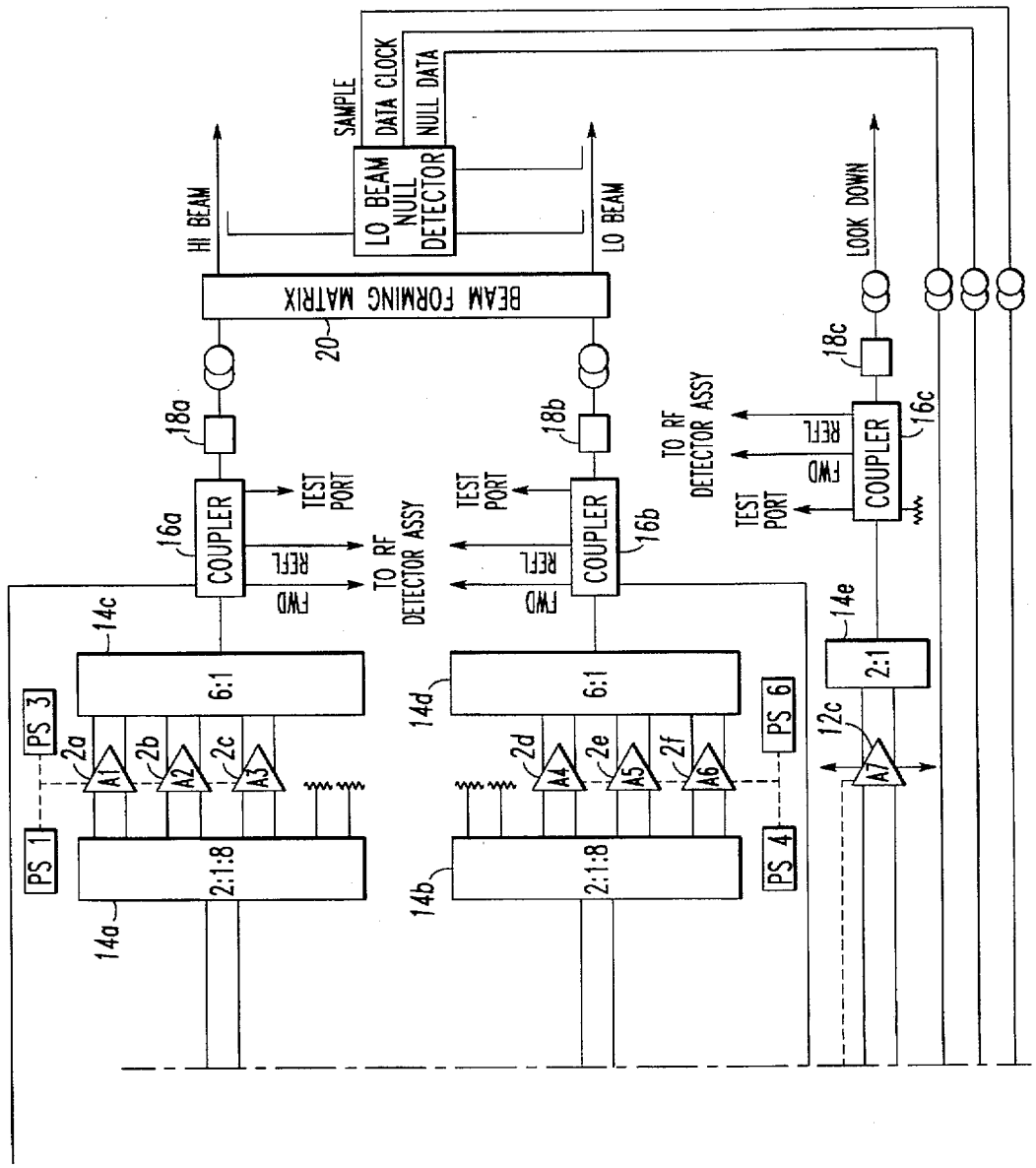
Figure 3:
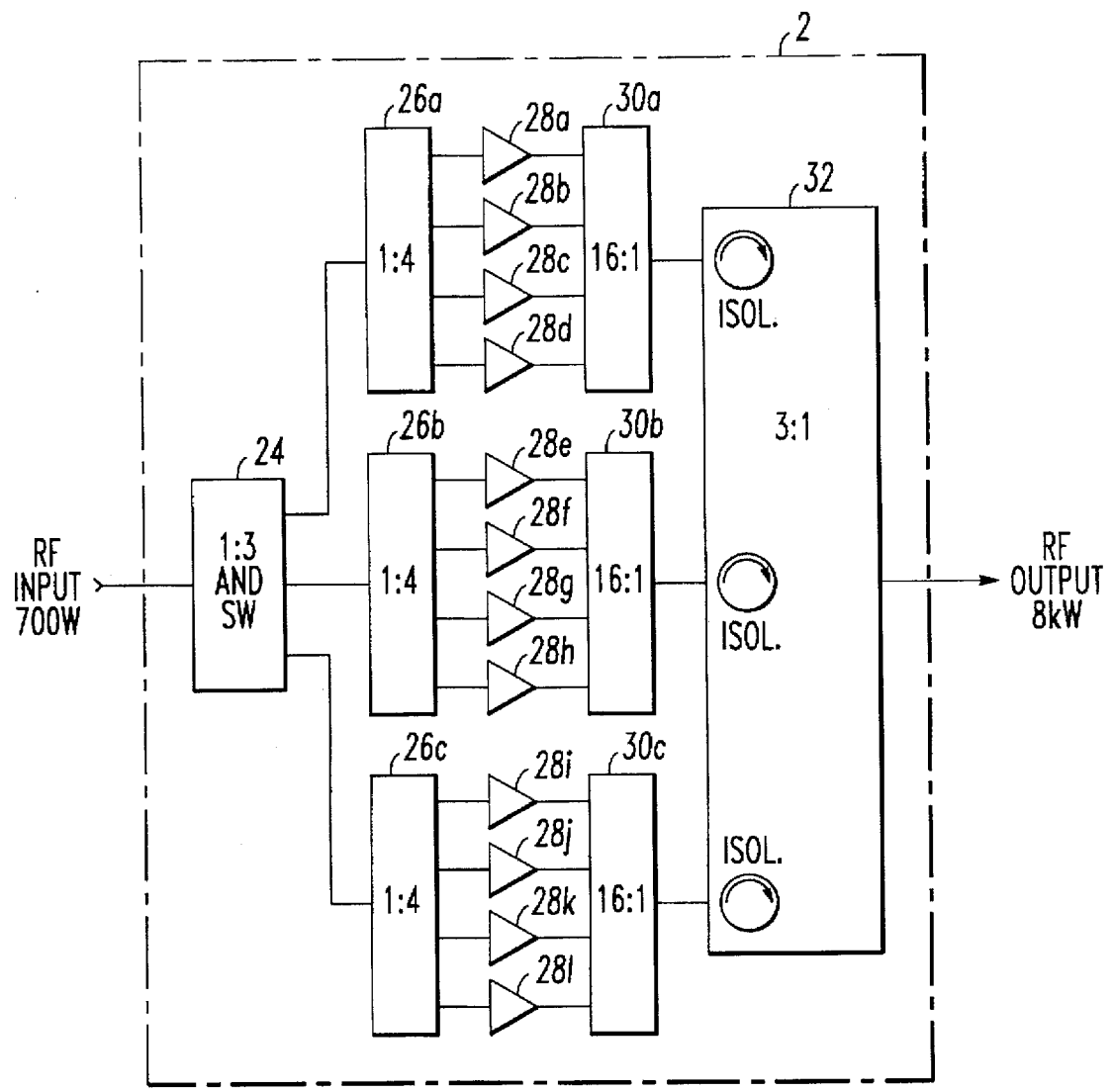
FIG. 3 illustrates a half panel block diagram of an RF panel used in the ARSR-4 solid state transmitter.
Figure 4:
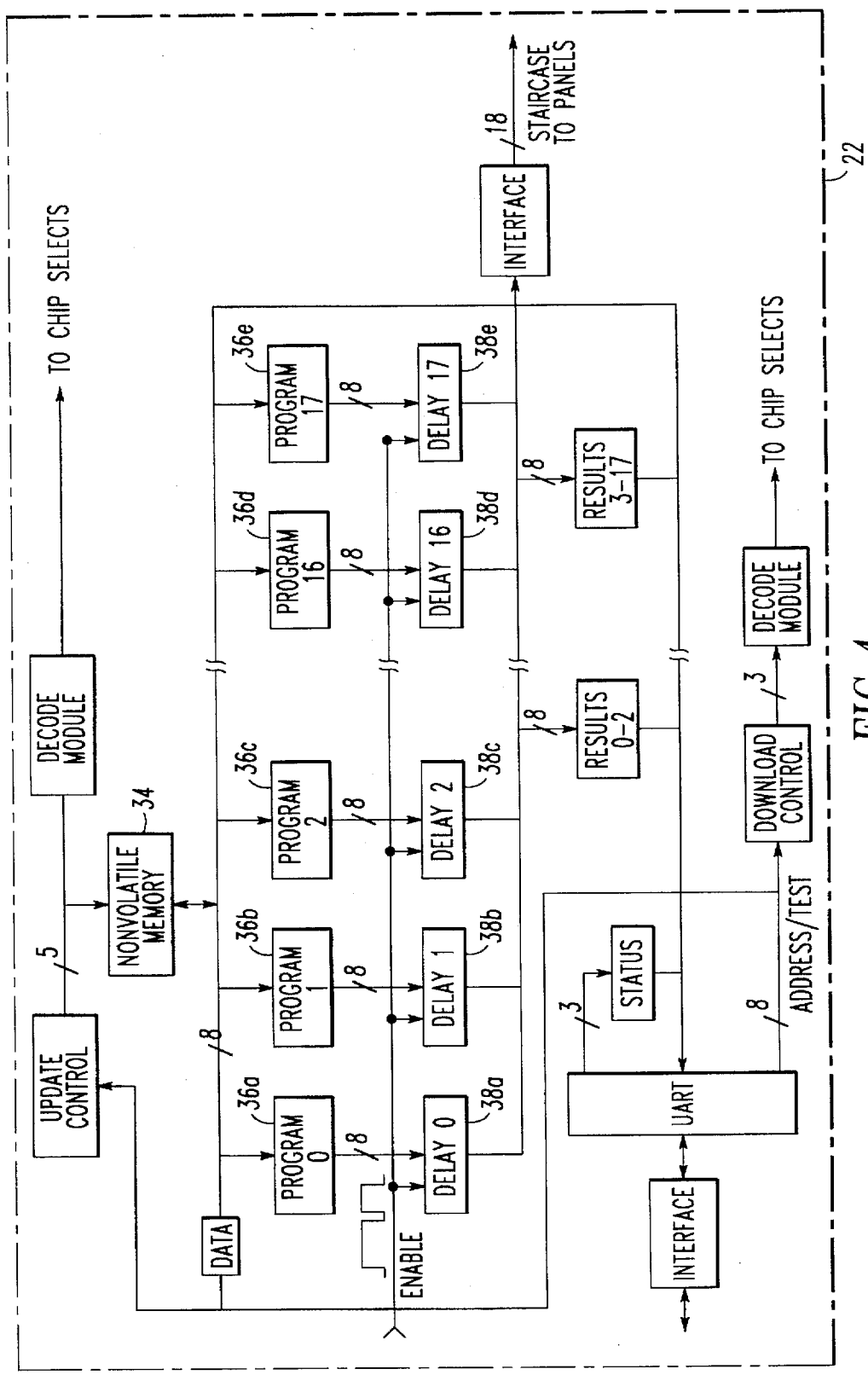
FIG. 4 illustrates the prior art pulse shaping technique implemented on the ARSR-4 solid state transmitter.
Figure 5B:
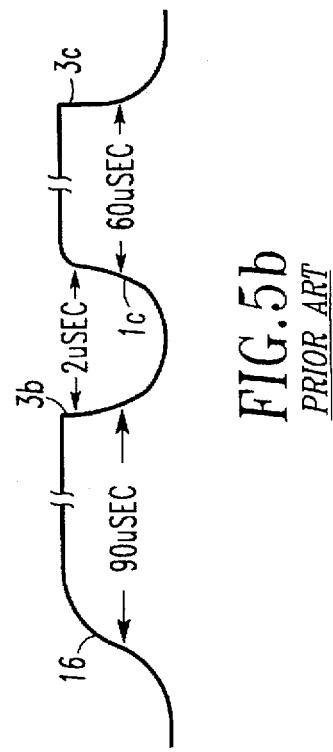
Figure 5A:
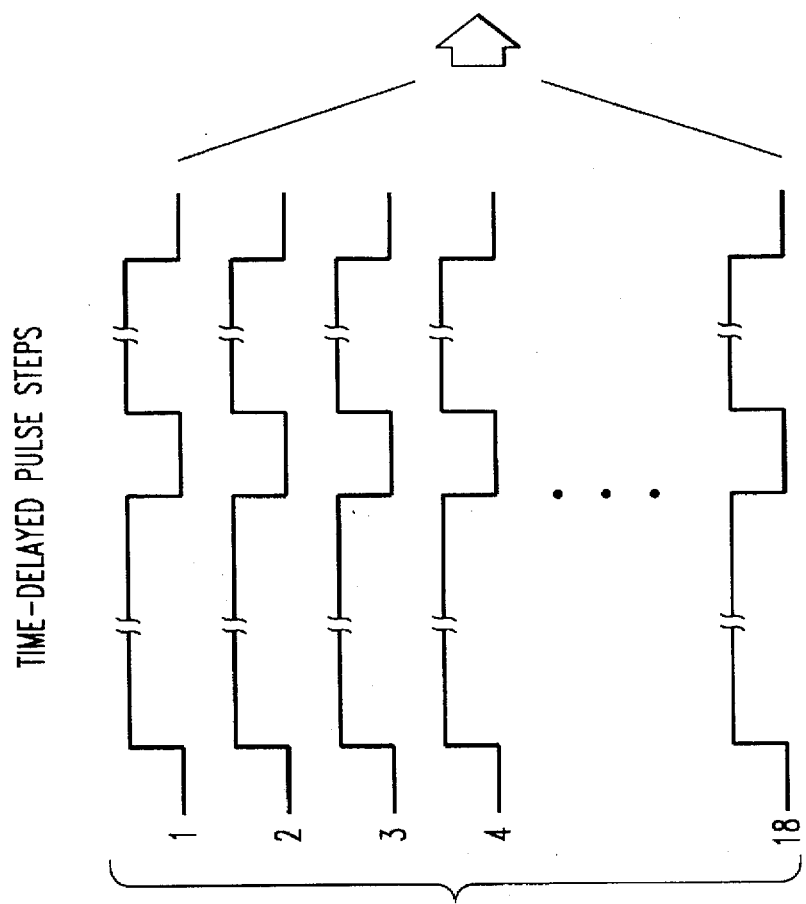
FIG. 5a illustrates the prior art technique of time delaying pulse steps to shape the rise time of an RF waveform, and prior art

Initially, it should be noted that the ASR-SS solid state S-band transmitter of the preferred embodiment of the present application is an improvement to the prior art ARSR-4 solid state transmitter. Therefore, the ASR-SS solid state S-band transmitter includes many components similar to those shown in prior art FIG. 2, corresponding to the ARSR-4 transmitter. Therefore, in connection with the present ASR-SS solid state S-band transmitter, only components different from those of the ARSR-4 transmitter will be discussed hereinafter.

FIG. 6 of the present application depicts, in block diagram form, a transmitter 42 and a receiver 44 of a radar detection system of the present application. Additionally, it is noted that the transmitter 42 and receiver 44 can be combined in a single unit, as indicated by the transceiver 40 of FIG. 6.

The ASR-SS solid state S-band transmitter of the present application is designed for a short range detection system such as that of an airport, for example. Such a short range detection system requires generation of a first subpulse at a first predetermined frequency and a second subpulse at a second predetermined frequency, wherein a pulse length of the first subpulse is of a relatively longer pulse length such as fifty-five microseconds for example, and the pulse length of the second subpulse is of a second relatively shorter pulse length, such as one microsecond for example. By transmitting such subpulses, objects are detectable by the radar detection system within a maximum range of over fifty nautical miles (approximately sixty miles) and within a minimum range of less than one mile (approximately one eighth of a mile). In such a system, the relatively shorter subpulse of one microsecond pulse width provides for object detection within a maximum range of approximately fifteen miles and a minimum range of approximately one eighth of a mile. Further, the relatively longer subpulse of a fifty-five microsecond pulse width provides for object detection within a maximum range of approximately sixty miles and a minimum range of approximately five miles. Preferably, the relatively shorter subpulse is used within a range from approximately one eighth of a mile to approximately six (or seven) miles, and the relatively longer subpulse is used within a range from approximately six (or seven) miles to approximately sixty miles.

FIG. 7 illustrates a block diagram of the RF portion of the ASR-SS solid state S-band transmitter of the present application. FIG. 7 illustrates a preamp 6 connected to a preamp switch 8, which is further connected to a driver 12. The driver 12 is then connected to an output device 46. The output device 46 includes a 1:12 splitter 48 for receiving an input from the driver 12, which is connected to 12 RF panels 52a–521. The 12 RF panels are then connected to a combiner 50. Timing control circuitry 64 is connected to, and controls, the driver 12 and the output panel 46 as will be described in detail in FIG. 8. The combiner 50 is coupled to a coupler 62, a waveguide 63, and a beam forming matrix 65 for transmitting an RF output.

Figures 7A, 7B:
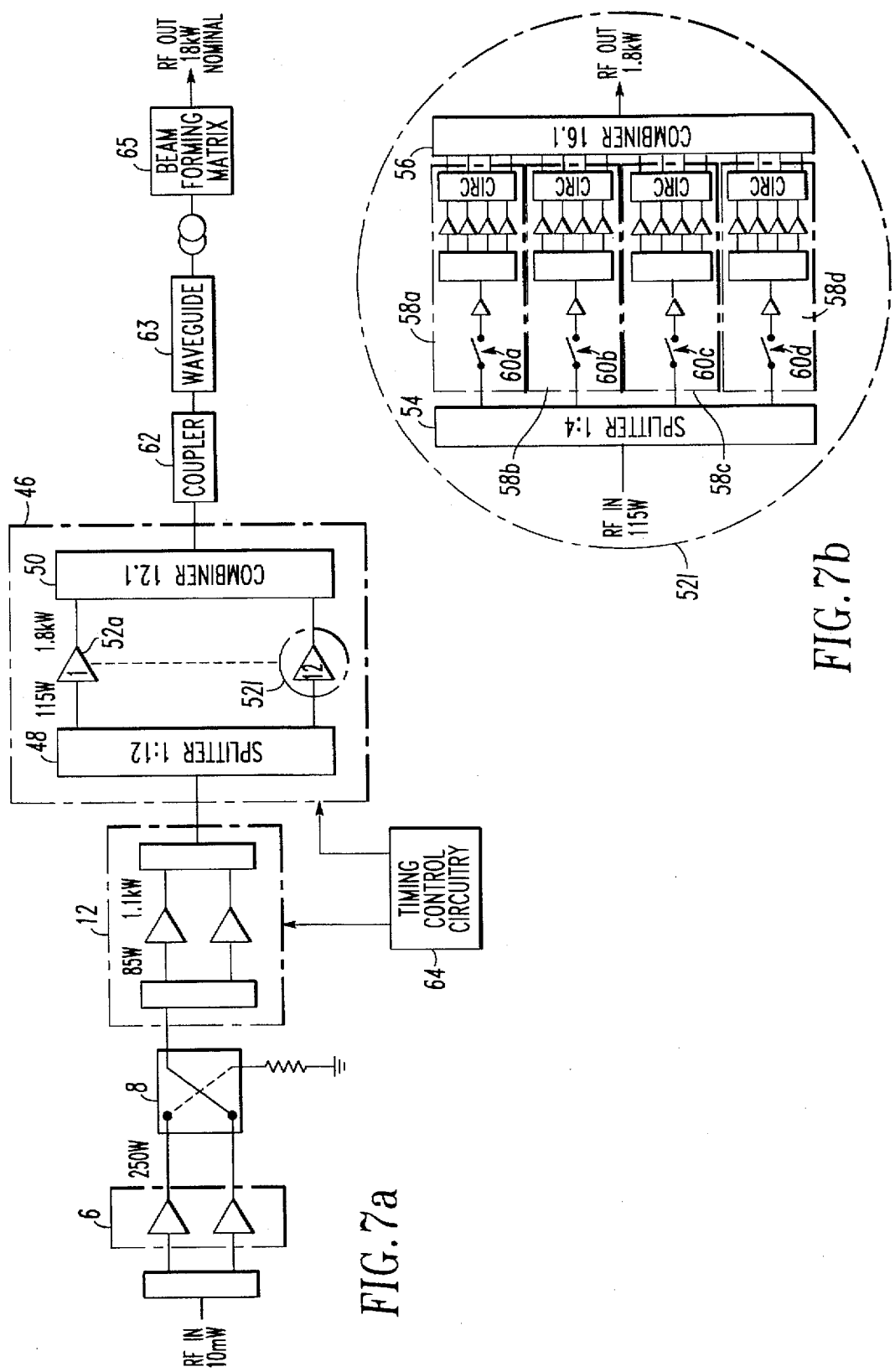
FIG. 7 illustrates a detailed description of the circuitry of the transmitter of the present invention.

FIG. 7a is an exploded version of one of the RF panels, 521, FIG. 7a being representative of each of the 12 RF panels 52a–521. As shown in FIG. 7a, the RF input power of 115 watts, for example, is input to a splitter 54 which is a 1:4 splitter for example. The splitter 54 is then connected to each of four PA modules 58a–58d, and more specifically, to each of four PIN diodes 60a–60d of the respective PA modules 58a–58d. The output of the PA modules 58–58d is then connected to a combiner 56, which is a 16:1 combiner for example. From the combiner 56, and RF output of 1.8 kilowatts, for example, is produced.

Figure 8:
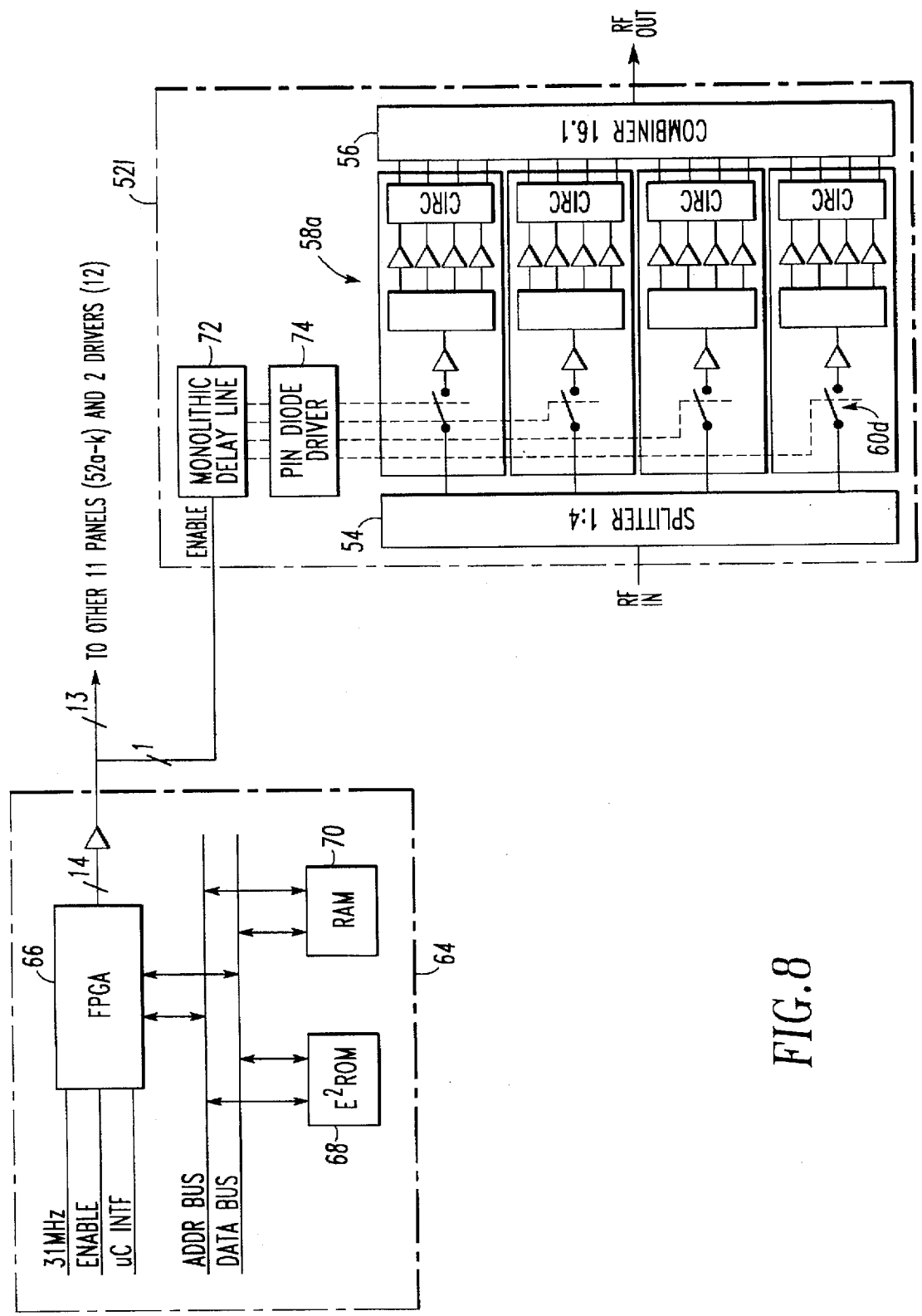
FIG. 8 illustrates a detailed description of the control circuitry utilized in the present invention.

FIG. 8 illustrates timing control circuitry 64, for controlling each of the RF panels 52a–521, in more detail. The timing control circuitry 64 is implemented with entirely digital components. This virtually eliminates the performance variations due to component tolerances and temperature variations, to provide a consistent transmitted spectrum from system to system. As shown in FIG. 8, the timing control circuitry 64 includes one field programmable gate array (FPGA) 66, one electrically erasable read only memory ($E^2$ ROM) 68, such as a programmable erasable read only memory, and two random access memory (RAM) chips, represented by RAM 70 in FIG. 8. The FPGA 66 communicates with and receives information from the $E^2$ ROM 68 and RAM 70 through a data bus and an address bus as shown in FIG. 8.

The output from the FPGA 66 of the timing control circuitry 64 is output to each of the 12 RF panels 52a–521 and to two drivers 12 to produce an output pulse including two subpulses, for example, with sloped rise times 76a and 76b and fall times 78a and 78b, as shown in FIG. 9 for example. More specifically, as shown with regard to RF panel 521 for example, the output of the FPGA 66 sends an enable signal to a monolithic delay line 72. The output of the monolithic delay line 72 is connected to a PIN diode driver 74. The PIN diode driver 74 includes four separate outputs, each connected to respective one of PIN diodes 60a–60d of PA modules 58a–58d, for sequentially activating the PIN diodes 60a–60d based upon incremental adjustment patterns prestored in $E^2$ ROM 68. Hereinafter, a description of the operation of the system and method of the present application will be discussed.

The pulse shaping technique of the present application utilizes PIN diodes 60a–60d to sequentially turn on and off PA modules 58a–58d of sequential RF panels 52a–521 to generate pulses and subpulses and to control rise and fall time of the pulses and sub-pulses. By use of the timing control circuitry 64 shown in FIG. 8, generation of each of the subpulses, pulse duration of the subpulses, and rise time and fall time of the subpulses are separately digitally adjusted independent of the others based on separately stored incremental adjustment patterns stored in $E^2$ ROM 68. This ensures transmission of the subpulses with a relatively narrow spectral bandwidth at each of different first and second predetermined frequencies of the first and second subpulses. Thus, this ensures relatively lower transmission power both above and below the predetermined frequencies of the generated subpulse (small sidelobes), with a high transmission power occurring at the predetermined frequency of the pulse. This is due to the separate shaping of both the rise and fall time of the subpulses.

The timing control circuitry 64 of FIG. 8 controls the RF panels 52a-1 of output device 46 to output to coupler 62, waveguide 63, and beam forming matrix 65, to subsequently transmit a pulse including a first subpulse SP1 and a second subpulse SP2 as shown in FIG. 9, for example, wherein the first subpulse SP1 is used for a relatively longer range radar detection from approximately six (or seven) nautical miles to over fifty (approximately sixty) nautical miles for example, and the second pulse SP2 is used for relatively short range radar detection from less than one (approximately one-eighth) nautical mile to approximately six (or seven) nautical miles. The pulse width of the first pulse SP1 is controlled to be a relatively long duration such as fifty-five microseconds for example, to achieve long range detection, and the second pulse SP2 is controlled to be relatively shorter in pulse length such as one microsecond for example, to achieve a shorter range detection.

Utilizing twelve RF panels 52, each with four PA modules 58a–58d with corresponding PIN diodes 60a–60d, the rise and fall time of each subpulse is separately and independently adjustable in a maximum of forty-eight steps (12 RF panels×4 PA modules=48). Preferably, however, twelve steps are used to create the rise and fall times 76b and 78b of the subpulse SP2 of a relatively shorter duration of approximately one microsecond and the maximum of forty-eight steps are used to create the rise and fall times 76a and 78a of the subpulse SP1 of a relatively longer duration of approximately fifty-five microseconds. The incremental adjustment pattern for each of the rise times 76a and 76b and fall times 78a and 78b are created as follows.

Initially, a predetermined desired rise and fall time curve is selected. For example, a cosine squared pattern is preferably selected for each of the rise and fall times of each of the subpulses SP1 and SP2. Then, a rise time length and a fall time length is selected for each of the subpulses, i.e. a time duration during which each subpulse respectively rises to its predetermined maximum value and falls to its predetermined minimum value. Therefore, for the relatively short subpulse, a relatively shorter rise time length of approximately 500 nanoseconds for example, and fall time length of approximately 600 nano-seconds for example, are selected and for the relatively long subpulse, a relatively longer rise time length and fall time length, each of approximately 1.2 microseconds for example, are selected.

Each rise time length and fall time length can be the same or different from each other. However, since each of the rise time and fall time incremental adjustment patterns are separately generated and stored, a gradually sloped rise time and fall time cosine squared pattern is preferably generated for each, and thus the fall time does not become the inverse of the rise time as occurred in the ARSR-4 (see 1a and 3a of FIG. 1d). Further, since incremental adjustment patterns are separately generated for rise and fall times of each subpulse, separate rise time and fall time lengths are preferably selected independent of each other for the one microsecond (relatively shorter) subpulse SP2 and independent of the rise time and fall time lengths for the fifty-five microsecond (relatively longer) subpulse SP1. The incremental adjustment patterns of the rise and fall times of each of the subpulses can also be a different number of steps (twelve for SP2 vs. forty-eight for SP1 for example). Thereby, a rise time and fall time are produced for each subpulse independent of the other, to provide for a gradual rise time and a gradual fall time with appropriate time constants and within tolerations of components.

Once appropriate rise and fall time lengths, curves (cosine-squared pattern for example), and number of steps are determined, an appropriate incremental adjustment pattern is then produced. Each adjustment pattern is then burned into the $E^2$ ROM 68 of the timing control circuitry 64, along with a pulse length of each of the subpulses (one microsecond for SP2 and fifty-five microseconds for SP1 for example).

The timing control circuitry 64, during operation of the system, sequentially reads each of the predetermined adjustment patterns (a first through fourth adjustment pattern for each of a rise time and fall time of each of a first and second subpulse, for example) from the $E^2$ ROM 68, and outputs signals to a monolithic delay line 72 of an RF panel 52, to control a PIN diode driver 74, to sequentially turn on and off PIN diodes 60 of PA modules 58, based upon appropriate adjustment pattern and stored pulse lengths. Specifically, a rise time incremental adjustment pattern of SP1 is initially used; at the forty-eighth (last) step, the prestored (in the $E^2$ ROM 68) pulse duration of SP1 is used to maintain all PA modules ON for fifty-five microseconds for example; fall time incremental adjustment pattern of SP1 is then used; a predetermined delay between subpulses is used at the forty-eighth (last) step to maintain all PA modules OFF for the predetermined delay (also prestored in $E^2$ ROM 68); rise time incremental adjustment pattern for SP2 is used; at the twelfth (last step), the prestored (in $E^2$ ROM 68) pulse duration for SP2 is used to maintain all PA module ON for one microsecond for example; and fall time incremental adjustment pattern of SP2 is then used. As such, a two-subpulse pattern as shown in FIG. 9 is produced, and output and transmitted through coupler 62, waveguide 63, and beam forming matrix 65.

Due to the short pulse width of one of the subpulses (here the second subpulse), and due to the requirement for low time sidelobes, the response time of the PIN diodes was decreased to 30–40 nanoseconds (a response time four to five times better than the 100–150 nanoseconds of the PIN diodes used in the ARSR-4 transmitter). To achieve this, a maximum negative bias voltage of the diodes was reduced from −200 volts to −50 volts.

The reduction in voltage allowed for use of faster biasing transistors which have a lower breakdown voltage. These transistors rapidly change the bias on the PIN diodes from fully forward biased with typically 30 mA of forward current to reverse biased (i.e. no conductivity) with −50 V. Transistors with over −200 V breakdown voltage operated at lower speeds and therefore did not switch the PIN diodes as rapidly.

The aforementioned pulse shaping techniques were achieved through the digital implementation of the timing control circuitry 64 as shown in FIG. 8, which enabled separate and independent digital adjustment of the rise time and the fall time of either or both of the first subpulse SP1 and second subpulse SP2, and which could be used for a subpulse of a relatively longer pulse width such as fifty-five microseconds and for a subpulse of a relatively shorter pulse width such as one microsecond. This also produced low time sidelobes in the time domain which essentially achieved characteristics similar to the filter 7 as shown in prior art FIG. 1c.

With the response time of the diodes decreased to 30–40 nanoseconds, pulse shaping of a very short pulse (one microsecond) is possible. Using PIN diodes with such a quick response time to control each of the PA modules (four PA modules 58a–d on each of twelve RF panels 52a–52l), a maximum of forty-eight pulse shaping steps can be provided in the output stage of the transmitter. These forty-eight steps can be used to shape either or both of rise time or fall time of either or both of the subpulses SP1 or SP2 as shown in FIG. 9. Preferably, however, the longer of the two subpulses SP1 is shaped using forty-eight pulse shaping steps, and the shorter of the two subpulses SP2 is shaped using approximately twelve pulse shaping steps. It should further be noted that the driver panels 12, can be identical to the RF panels 52. Thus, it is possible to control the shape of the RF drive signal into the output device 46 for further control, if necessary.

The PA modules 58 have built-in circulator protection, such that the turning off of one module does not affect any of the others in the system. Transmitter output power varies with an exponential power law of approximately 1.5. For example, if one module out of forty-eight is turned off, the transmitter output power falls to approximately $(47/48)^{1.5}$ times its original value or 96.9%. For the second module, the power drops to $(46/48)^{1.5}$, or 93.8%, and so on.

The technique of the present application utilizing the timing control circuitry 64 shown in FIG. 8 of the present application provides a solution to the aforementioned shortcomings of the prior art, including the prior art ARSR-4 transmitter. The timing control circuitry is implemented entirely with digital components, which virtually eliminates performance variations due to component tolerances and temperature variations. Circuitry is reduced, which reduces recurring costs per transmitter from over $9,000.00 to approximately $200.00. The design can also be easily reconfigured for different transmitter architectures, simply by increasing or decreasing the width of the output data bus. Through the use of digital memory ($E^2$ ROM 68 and RAM 70) and a monolithic delay line 72 as opposed to analog delay lines 38a–38e of the ARSR-4 transmitter, the rise time, fall time, and pulse width can all be independently programmed for each subpulse.

It should be noted that the present application has been described in terms of transmitting a pulse including a first and second subpulse. This should not be considered limitive of the present invention in that a single pulse can be transmitted or a pulse including three or more subpulses can be transmitted. Additionally, the rise and/or fall time of any or all of the pulses or subpulses generated can be shaped prior to transmission, independent of each other and independent of other pulses or subpulses.

Further, the present application has been described in terms of burning each incremental adjustment pattern (once determined) into an $E^2$ ROM for each rise and fall time to be shaped, separately for each pulse or subpulse. However, it should be noted that the incremental adjustment pattern could be determined within the transmitter via a microprocessor, for example, and could thereafter be stored in memory without burning into an $E^2$ ROM.

Still further, it should be noted that maximum and minimum detection range of a pulse are dependent upon pulse width. Therefore, the present application is intended to cover other relatively long and short subpulses other than those specifically specified depending upon maximum and minimum range requirements.

Even further, it should be noted that FIGS. 7 and 7a depict an output device 46 with twelve RF panels 52a–52l, with each RF panel including four PA modules 58a–58d. This provides for a maximum of forty-eight steps for the rise and fall times. This should not be considered limitive since more than forty-eight steps can be achieved, assuming more RF panels are added and assuming power and other constraints allow for such additions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A transmitter, comprising:

pulse generating means for generating a first subpulse at a first predetermined frequency and a second subpulse at a second predetermined frequency, different from the first predetermined frequency;

pulse shaping means for digitally adjusting at least one of a rise time and a fall time of at least one of the generated first subpulse and second subpulse, each of the rise time and fall time of at least one of the first and second subpulses being separately adjustable independent of the other to provide for transmission of a relatively narrow spectral width at the first and second predetermined frequencies; and transmission means for transmitting the generated first subpulse and second subpulse at the respective first and second predetermined frequencies, as digitally adjusted by the pulse shaping means.

2. The transmitter of claim 1, wherein the radar transmitter is for use in a radar detection system in an airport and the first subpulse and second subpulse are used for radar detection over a range exceeding fifty miles.

3. The transmitter of claim 1, wherein the first subpulse is used for relatively long range radar detection and the second subpulse is used for relatively short range radar detection.

4. The transmitter of claim 1, wherein the first subpulse is of a first predetermined relatively longer pulse length and the second subpulse is of a second relatively shorter pulse length.

5. The transmitter of claim 1, wherein the pulse shaping means includes incrementing means for separately incrementally adjusting each of the rise time and fall time of at least one of the first and second subpulses.

6. The transmitter of claim 5, wherein the incrementing means is for separately incrementally adjusting each of the rise time and fall time in a maximum of forty-eight increments.

7. The transmitter of claim 2, wherein the second subpulse is used for radar detection over a range from less than one mile to approximately six miles and the first subpulse is used for radar detection over a range from approximately six miles to greater than fifty miles.

8. The transmitter of claim 4, wherein the second subpulse is approximately one micro-second in pulse length and the first subpulse is approximately fifty-five micro-seconds in pulse length.

9. The transmitter of claim 5, wherein the rise and fall times of the first and second subpulses are separately incrementally adjusted to create respective first and second subpulses for transmission of a relatively high output power and of a relatively narrow spectral width at each of the respective first and second predetermined frequencies and relatively low output power over a frequency transmission range extending above and below each of the respective first and second predetermined frequencies.

10. The transmitter of claim 5, wherein the incrementing means includes a plurality of modules, each of the modules being sequentially turned on and off for varying durations of time to establish the incremental adjustment.

11. The transmitter of claim 10, wherein each of the plurality of modules includes a corresponding diode for turning a respective one of the plurality of modules on and off.

12. The transmitter of claim 11, wherein the pulse shaping means includes a memory for storing an incremental adjustment pattern for at least one of the rise time and fall time of at least one of the first subpulse and second subpulse.

13. The transmitter of claim 12, wherein the incrementing means includes the plurality of modules, sequentially enabled by the plurality of corresponding diodes, for separate incremental adjustment of both the rise time and the fall time for each of the first and second subpulses, each separate incremental adjustment based on a separate independent adjustment pattern stored in the memory.

14. The transmitter of claim 13, wherein the pulse generating means further includes a memory for storing a first predetermined relatively longer pulse length for the first subpulse and a second predetermined relatively shorter pulse length for the second subpulse.

15. A transmitter, comprising:
   timing control means for storing a first adjustable pulse length for a first subpulse and a second adjustable pulse length from a second subpulse and for storing a first incremental adjustment pattern for adjusting a rise time of the first subpulse, a second incremental adjustment pattern for adjusting a fall time of the first subpulse, a third incremental adjustment pattern for adjusting a rise time of the second subpulse, and a fourth incremental adjustment pattern for adjusting a fall time of the second subpulse, the rise time and fall time of each of the first and second subpulses being separately and independently adjustable; and
   output means for outputting a transmission pulse including the first subpulse, output at a first frequency, of the first adjustable pulse length with rise and fall times separately adjusted by the respective first and second incremental adjustment patterns, and the second subpulse, output at a second frequency different from the first frequency, of the second adjustable pulse length with rise and fall times separately adjusted by the respective third and fourth incremental adjustment patterns, the rise and fall times of each of the first and second subpulses being independently adjusted to provide for transmission of a relatively narrow spectral width at each of the first and second frequencies.

16. The transmitter of claim 15, wherein the first subpulse is of a first predetermined relatively longer pulse length and the second subpulse is of a second relatively shorter pulse length.

17. The transmitter of claim 15, wherein the second subpulse is used for radar detection over a range from less than one mile to approximately six miles and the first subpulse is used for radar detection over a range from approximately six miles to greater than fifty miles.

18. The transmitter of claim 16, wherein the second subpulse is approximately one micro-second in pulse length and the first subpulse is approximately fiftyfive microseconds in pulse length.

19. The transmitter of claim 15, wherein the output means includes a plurality of modules, each of the modules being sequentially turned on and off for varying durations of time determined based upon the first, second, third and fourth incremental adjustment patterns.

20. The transmitter of claim 19, wherein the output means includes a plurality of diodes, each corresponding to one of the plurality of modules, each for sequentially turning on and off a respective one of the plurality of modules based upon the first, second, third, and fourth incremental adjustment patterns.

21. A radar detection system comprising:
   a transmitter including,
      pulse generating means for generating a first subpulse at a first predetermined frequency and a second subpulse at a second predetermined frequency, different from the first predetermined frequency,
      pulse shaping means for digitally adjusting at least one of a rise time and a fall time of at least one of the generated first subpulse and second subpulse, each of the rise time and fall time of at least one of the first and second subpulses being separately adjustable independent of the other to provide for transmission of a relatively narrow spectral width at the first and second predetermined frequencies, and
      transmission means for transmitting the generated first and second subpulses at the respective first and second predetermined frequencies, as digitally adjusted by the pulse shaping means; and
   a receiver for detecting the first transmitted subpulse at the first predetermined frequency for relatively long range radar detection and for detecting the second transmitted subpulse at the second predetermined frequency for relatively short range radar detection.

22. The radar detection system of claim 21, wherein the radar detection system is for use at an airport and the first subpulse and the second subpulse are used for radar detection over a range exceeding fifty miles.

23. The radar detection system of claim 21, wherein the first subpulse is of a first predetermined relatively longer pulse length and the second subpulse is of a second predetermined relatively shorter pulse length.

24. The radar detection system of claim 23, wherein the second subpulse is approximately one micro-second in pulse length and the first subpulse is approximately fifty-five micro-seconds in pulse length.

25. The radar detection system of claim 21, wherein the pulse shaping means of the transmitter includes incrementing means for separately incrementally adjusting each of the rise time and fall time of at least one of the first and second subpulses.

26. The radar detection system of claim 25, wherein the incrementing means is for separately incrementally adjusting each of the rise time and fall time in a maximum of forty-eight increments.

27. The radar detection system of claim 21, wherein the receiver detects the second transmitted subpulse within a range from less than one mile to approximately six miles and detects the first transmitted subpulse within a range from approximately six miles to greater than fifty miles.

28. The radar detection system of claim 25, wherein the rise and fall times of the first and second subpulses are separately incrementally adjusted to create respective first and second subpulses for transmission of a relatively high output power and of a relatively narrow spectral width at each of the respective first and second predetermined frequencies and relatively low output power over a frequency transmission range extending above and below each of the respective first and second predetermined frequencies.

29. A pulse shaping method for use in a transmitter, comprising the steps of:
   (a) generating a pulse at a predetermined frequency;
   (b) digitally adjusting at least one of a rise time and a fall time of the pulse, each of the rise time and fall time of the pulse being separately adjustable independent of the other to provide for transmission of a relatively narrow spectral width at the predetermined frequency; and
   (c) outputting the generated pulse as digitally adjusted, for subsequent transmission by the transmitter at the predetermined frequency.

30. The pulse shaping method of claim 29, wherein the pulse generated in step (a) includes a first subpulse at a first predetermined frequency and a second subpulse at a second predetermined frequency, the digital adjusting of step (b) is performed on at least one of the first subpulse and the second subpulse, and the generated first and second subpulses, as digitally adjusted, are output in step (c).

31. The pulse shaping method of claim 30, wherein the first and second subpulses are transmitted and used for radar detection over a range exceeding fifty miles.

32. The pulse shaping method of claim 30, wherein the first subpulse generated in step (a) is of a first predetermined relatively longer pulse length and the second subpulse generated in step (b) is of a second predetermined relatively shorter pulse length.

33. The pulse shaping method of claim 32, wherein the second predetermined relatively shorter pulse length is approximately one micro-second in pulse length and the first predetermined relatively longer pulse length is approximately fifty-five micro-seconds in pulse length.

34. The pulse shaping method of claim 30, wherein step (b) includes separately incrementally adjusting each of the rise time and fall time of at least one of the first and second subpulses.

35. The pulse shaping method of claim 34, wherein step (b) further includes separately incrementally adjusting each of the rise time and fall times in a maximum of forty-eight increments.

* * * * *